United States Patent [19]

Suzuki et al.

[11] Patent Number: 5,682,568

[45] Date of Patent: Oct. 28, 1997

[54] CAMERA WITH APPARATUS FOR MAINTAINING FILM FLAT DURING PHOTOGRAPHING OPERATION

[75] Inventors: Tatsuya Suzuki; Hiroaki Miyazaki, both of Tokyo, Japan

[73] Assignee: Olympus Optical Co., Ltd., Tokyo, Japan

[21] Appl. No.: 766,930

[22] Filed: Dec. 16, 1996

Related U.S. Application Data

[60] Continuation of Ser. No. 442,874, May 17, 1995, abandoned, which is a division of Ser. No. 91,713, Jul. 15, 1993, Pat. No. 5,459,543.

[30] Foreign Application Priority Data

Jul. 16, 1992 [JP] Japan ................................. 4-189661

[51] Int. Cl.$^6$ .................................................. G03B 17/00
[52] U.S. Cl. ................................. 396/440; 396/442
[58] Field of Search ................................. 396/439, 440, 396/442, 538; 352/221, 223, 224; 355/75

[56] References Cited

U.S. PATENT DOCUMENTS

| | | | |
|---|---|---|---|
| 3,488,120 | 1/1970 | Nagel | 355/75 |
| 4,034,388 | 7/1977 | Iwashita et al. | 354/173.1 |
| 4,331,275 | 5/1982 | Therien et al. | 226/188 |
| 4,395,103 | 7/1983 | Tezuka | 354/212 |
| 4,751,538 | 6/1988 | Konno | 354/212 |
| 5,122,830 | 6/1992 | Imaeda et al. | 355/27 |

*Primary Examiner*—Safet Metjahic
*Assistant Examiner*—J. K. Han
*Attorney, Agent, or Firm*—Finnegan, Henderson, Farabow, Garrett & Dunner, L.L.P.

[57] ABSTRACT

A camera includes a camera body having a photographing mask, a cassette chamber on one side of the photographing mask and a film winding spool on the other side. A motor rotates the winding spool in a film winding direction and a spring pushes the film toward the photographing mask to thereby apply a predetermined load against movement of the film. A roller applies to the film a tensile force which is smaller than the predetermined load on the film winding side to maintain the film flat at the photographing mask.

3 Claims, 7 Drawing Sheets

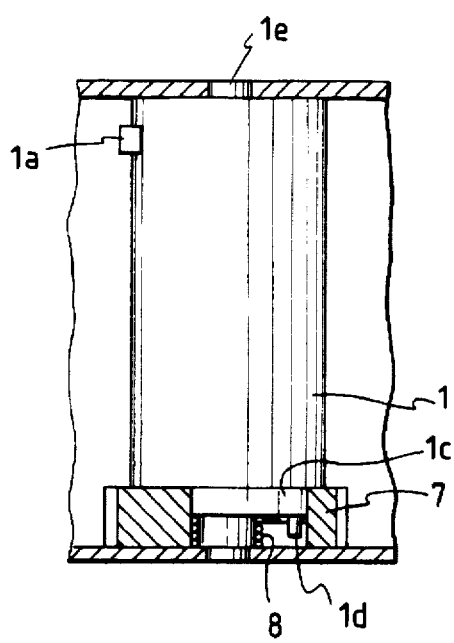
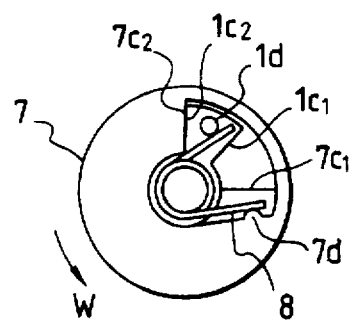
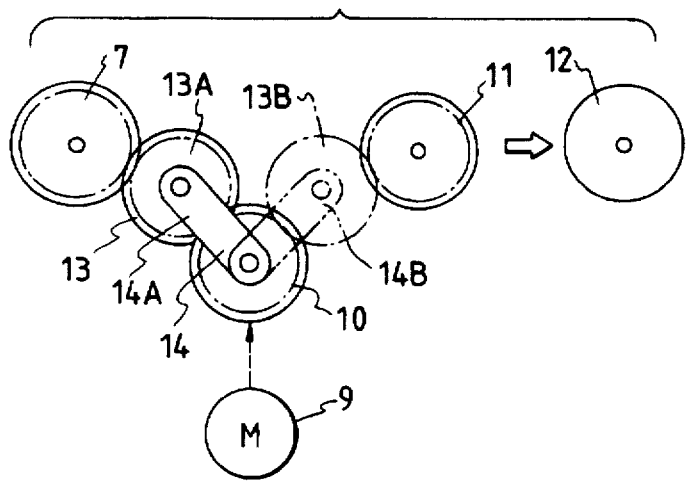
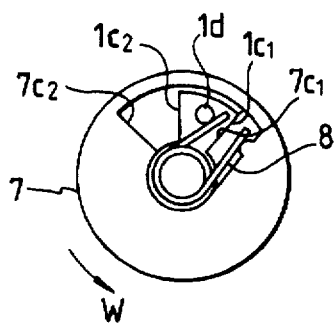
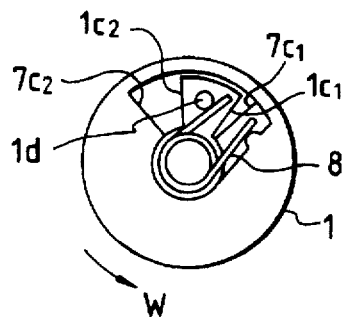

CAMERA WITH APPARATUS FOR MAINTAINING FILM FLAT DURING PHOTOGRAPHING OPERATION

This application is a continuation of application Ser. No. 08/442,874, filed May 17, 1995 now abandoned, which is a divisional of application Ser. No. 08/091,713, filed Jul. 15, 1993, now U.S. Pat. No. 5,459,543.

BACKGROUND OF THE INVENTION

1. Field of the Invention

This invention relates to cameras, and more particularly to a mechanism for maintaining a photographing film flat in the photographing mask section of a camera using a roll film.

2. Discussion of the Related Art

In a camera using a roll film, the film is pulled out along the photographing mask of the camera body, and when the film is to be exposed, it is maintained flat. For this purpose, the pressure plate is abutted against the film on the photographing mask with a predetermined distance maintained between the film and the photographing lens.

Japanese Patent Application (OPI) No. 120840/1990 (the term "OPI" as used herein means an "unexamined published application") has disclosed a camera using a film cassette. The camera has a mechanism for maintaining the film flat in the photographing plane. The mechanism operates as follows: After the film is fed, a stop is pressed against the aperture frame via the film to make the film flat, and to accurately set the film at the focusing position of the photographing lens.

In the above-described conventional camera, the pressure plate is set behind the film, which makes it difficult to reduce the thickness of the camera. In addition, since it is necessary to use the pressure plate and its relevant components, the camera is relatively large in the number of manufacturing steps, and accordingly high in manufacturing cost. On the other hand, in the camera disclosed by the aforementioned Japanese Patent Application (OPI) No. 120840/1990, the film is pushed against the aperture frame, and therefore it is necessary to use the stop corresponding to the pressure plate. In this case, too, it is rather difficult to reduce the thickness of the camera.

SUMMARY OF THE INVENTION

Accordingly, an object of this invention is to eliminate the above-described difficulties accompanying a conventional camera.

More specifically, an object of the invention is to provide a camera in which, in a photographing operation, tension is applied to the film to maintain the film flat and to dispense with the pressure plate which, in a conventional camera, is set behind the film, whereby the camera can be decreased in thickness as much, and reduced in manufacturing cost.

In order to attain this and other objects, according to the present invention, there is provided a camera having a photographing mask, a cassette chamber on one side of the photographing mask and a film winding spool on the other side, comprising: an electric power driving means for drivingly rotating the winding spool in a film winding direction; a spring means disposed between the cassette chamber and the photographing mask, the spring means including a first spring member for pushing a film cassette toward an inner wall of the cassette chamber to thereby position the cassette in place, and a second spring member for pushing the film, drawn from the film cassette, toward the photographing mask to thereby apply a predetermined load against movement of the film; and means for applying to the film a tension which is smaller than the load on the film winding side, the tension applying means including a spring member in which a spring force is charged in response to a winding operation of the film and is effected in the winding direction after completing a winding of the film as much as one frame of the film.

According to another aspect of the invention, there is provided a camera having a photographing lens on a forward side of a camera body, a rear cover on a rearward side of the camera body for loading/unloading film, a photographing mask between the photographing lens and the rear cover, a cassette chamber on one side of the photographing mask and a film winding spool on the other side of the photographing mask, the camera comprising: an electric power driving means for drivingly rotating the spool in a film winding direction; a spring means disposed between the cassette chamber and the photographing mask, the spring means including a first spring member for pushing film cassette toward an inner wall of the cassette chamber to thereby position the cassette in place, and a second spring for pushing the film, drawn from the film cassette, toward the photographing mask to thereby apply a predetermined load against movement of the film; and means for applying to the film a tension which is smaller than the load on the film winding side, the tension applying means including a tension spring member in which a spring force is charged in response to a winding operation of the film and is effected after completing a winding of the film as much as one frame of the film, whereby a flatness of the film is maintained by the load of the second spring and the spring force of the tension spring member to thereby dispense with a film pressure plate for keeping the film flat.

According to another aspect of the invention, there is provided a camera having a photographing mask, a cassette chamber on one side of the photographing mask and a film winding chamber on the other side, comprising: a resistance applying means disposed in the cassette chamber for applying a predetermined resistance against movement of the film; a film winding spool disposed in the film winding chamber; a rotating driving source for driving the spool; a rotational torque applying means disposed between the spool and the rotating driving means for applying to the spool a rotational torque in a film winding direction when the rotating driving means stops, wherein the rotational torque of the rotational torque applying means in the film winding direction is smaller than the resistance against the movement of the film.

The rotational torque applying means may include a sector-shaped cutaway portion formed in one of the rotating driving source and the spool, a sector-shaped projection provided on the other of the rotating driving source and the spool with the sector-shaped projection being narrower than the sector-shaped cutaway portion, and a spring member interposed between the rotating driving source and the spool for floatingly supporting the spool relative to the rotating driving source.

The resistance applying means may include a spring member interposed between the photographing mask and the cassette chamber for pushing the film.

The spring member of the resistance applying means may include a pair of upper and lower spring units disposed above and below an exposure section of the film or the photographing mask.

The resistance applying means may include a spring member for applying friction to a shaft of the camera engaged with a shaft of a film cassette to be loaded in the cassette chamber.

According to another aspect of the invention, there is provided a camera having a photographing mask, a cassette chamber on one side of the photographing mask and a film winding chamber on the other side, comprising: means for stopping movement of the film on a side of the cassette chamber; a film winding spool disposed in the film winding chamber; a rotating driving source for driving the spool; and a rotational torque applying means interposed between the spool and the rotating driving source for applying a rotational torque to the spool in a film winding direction during a standstill of the rotating driving source, wherein the rotational torque of the rotational torque applying means in the film winding direction is smaller than a force of the stopping means.

According to still another aspect of the invention, there is provided a camera having a photographing mask, a film supply portion on one side of the photographing mask and a film winding portion on the other side of the photographing mask, the camera comprising: an electric power driving means for driving the film winding portion; a resistance applying means for applying to the film a predetermined film movement resistance on a side of the film supply portion; and a tension applying means for applying to the film a tension smaller than the film movement resistance on a side of the film winding portion.

According to the invention, a camera having a photographing mask, a film supply portion on one side of the photographing mask and a film winding chamber on the other side of the photographing mask, the camera may comprise: an electric power driving means for winding a film; a resistance applying means for applying to the film a predetermined film movement resistance on a side of the film supply portion; and a tension applying means for applying to the film a tension smaller than the film movement resistance on a side of the film winding chamber, the tension applying means including a means for pushing the film toward the film winding chamber.

The film pushing means may include a roller member biased to push the film toward the film winding chamber between a film winding spool disposed in the film winding chamber and the photographing mask.

According to the invention, there is provided a camera having a photographing mask, a film cassette chamber on one side of the photographing mask and a film winding chamber on the other side of the photographing mask, comprising: a first rotary drive source engaged with a film cassette loaded in the film cassette chamber for drivingly rotating a shaft of the film cassette in a film rewinding direction; a second rotary drive source for drivingly rotating a film rewinding spool, disposed in the winding chamber, in a film winding direction; a control means for actuating the second rotary drive source after completion of exposure on a film and for actuating the first rotary drive source after completion of winding corresponding to one frame of the film and finish of the film, the control means including a means for applying a high voltage to the first rotary drive source after the finish of the film and applying a low voltage to the first rotary drive source upon the completion of winding of the film corresponding to one frame of the film.

A camera having a photographing mask, a film cassette chamber on one side of the photographing mask and a film winding chamber on the other side of the photographing mask, comprises: a first rotary drive source engaged with a film cassette loaded in the film cassette chamber for drivingly rotating a shaft of the film cassette in a film rewinding direction; a second rotary drive source for drivingly rotating a film rewinding spool, disposed in the winding chamber, in a film winding direction; a control means for actuating the second rotary drive source to fully wind the film after completion of loading of the film cassette in the film cassette chamber and actuating the first drive source and the second drive source in response to a photographing operation, the control means including a means for actuating the second rotary drive source at a low voltage during the photographing operation, and actuating the first drive source after completion of exposure on the film.

A camera comprises: a mask means for defining an exposure region of a film by a photographing light; a film cassette chamber disposed on one side of the mask means for receiving a film cassette; a spool disposed on the other side of the mask means for winding thereon a film of the film cassette; and a tension applying means interposed between the film cassette and the spool for applying a tension to the film in confronted relation with the mask means.

A camera comprises; a mask means for defining an exposure region of a film by a photographing light; a film cassette chamber disposed on one side of the mask means for receiving a film cassette; a load applying means disposed between the mask means and the film cassette chamber for applying a load against a feed of the film; a spool disposed on the other side of the mask means for winding thereon the film of the film cassette; and a tension applying means disposed in the spool for applying a tension in a travel direction of the film wound between the film cassette and the spool.

According to the invention, there is provided a camera comprising: a mask means for defining an exposure region of a film by a photographing light; a film cassette chamber disposed on one side of the mask means for receiving a film cassette; a spool means disposed on the other side of the mask means for winding a film of the film cassette, the spool means including a spool member and a winding biasing means for applying a rotational torque in a direction where the film is wound on the spool member; and a film supply load means for rewinding the film into the film cassette and for applying a load to the film during film supply, wherein at least when the photographing light is exposed onto the film, the spool means and the film supply load means cooperate with each other to impart a tension to the film.

According to a still another embodiment of the invention, there is provided a camera comprising: a mask means for defining an exposure region of a film by a photographing light; a film cassette chamber disposed on one side of the mask means for receiving a film cassette; a load applying means disposed between the mask means and the film cassette chamber for applying a load against a feed of the film; a spool disposed on the other side of the mask means for winding thereon the film of the film cassette; a drive means for driving the spool to wind the film on the spool; and a control means for driving a drive force in a direction where the film is wound on the spool, to such an extent that a flatness of the film is maintained at least when the photographing light is exposed on the film.

A camera may comprise: a mask means for defining an exposure region of a film by a photographing light; a film cassette chamber disposed on one side of the mask means for receiving a film cassette; a film supply load applying means disposed between the mask means and the film cassette chamber; a spool disposed on the other side of the mask means for winding the film of the film cassette; and a tension applying means disposed between the spool and the mask means for imparting a tension to the film retained between the tension applying means and the film supply load applying means in cooperation with the film supply load applying means at least when the photographing light is exposed on the film.

A camera may comprise: a mask means for defining an exposure region of a film by a photographing light; a film cassette chamber disposed on one side of the mask means for receiving a film cassette; a rewinding drive shaft disposed within the cassette chamber for rewinding the film into the film cassette; a spool interposed on the other side of the mask means for winding the film of the film cassette; a film supply load applying means disposed between the mask means and the spool for pushing the film; a drive means for driving the rewinding drive shaft; and a control means for driving the drive means to impart a tension to the film in a direction where the film is rewound into the film cassette, to such an extent that the film is prevented from moving at least when the photographing light is exposed on the film.

BRIEF DESCRIPTION OF THE DRAWINGS

In the accompanying drawings:

FIG. 4 is a sectional view of the spool and its relevant components in the camera shown in FIG. 1;

FIG. 5 is an explanatory diagram showing a change-over epicyclic gear train for driving the winding mechanism and the rewinding mechanism in the camera shown in FIG. 1;

FIGS. 6, 7 and 8 are diagrams showing various states of the spool and a spool gear in the camera as viewed from the spool gear side, for a description of the operations of them—more specifically, in FIG. 6, the film is not wound on the spool yet, in FIG. 7, the film is being wound, and in FIG. 8, the film has been wound;

Figure 12:
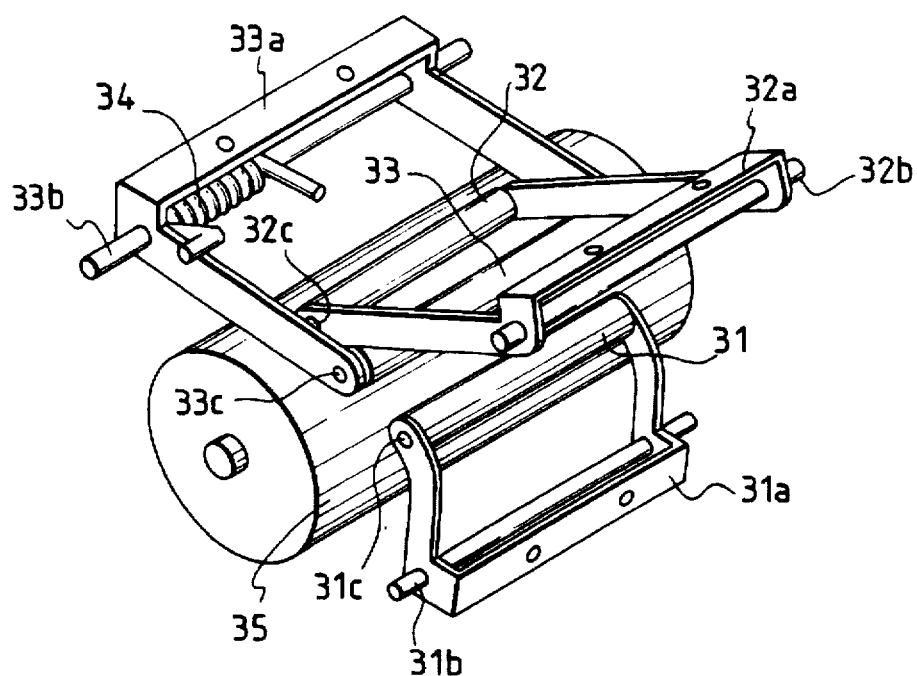
FIG. 12 is a perspective view of a spool and its relevant components in another example of the camera, which constitutes a fourth embodiment of the invention.
Figure 14:
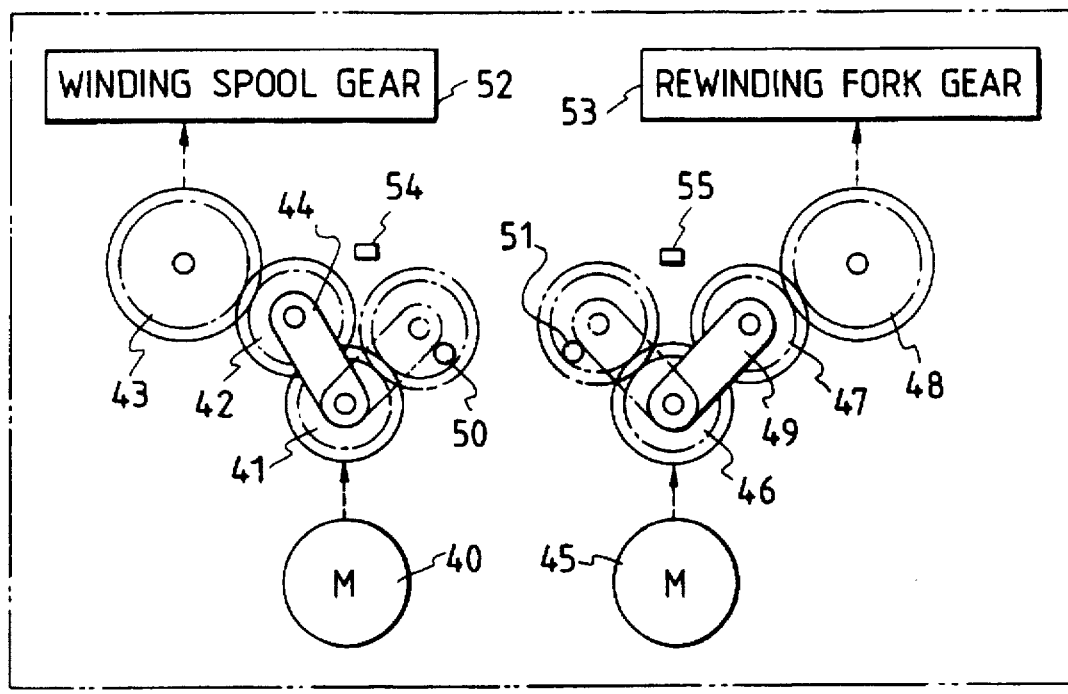
Figure 15:
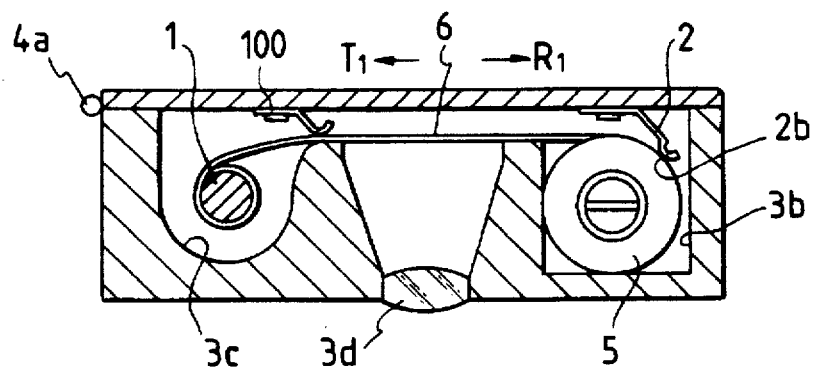
Figure 16:
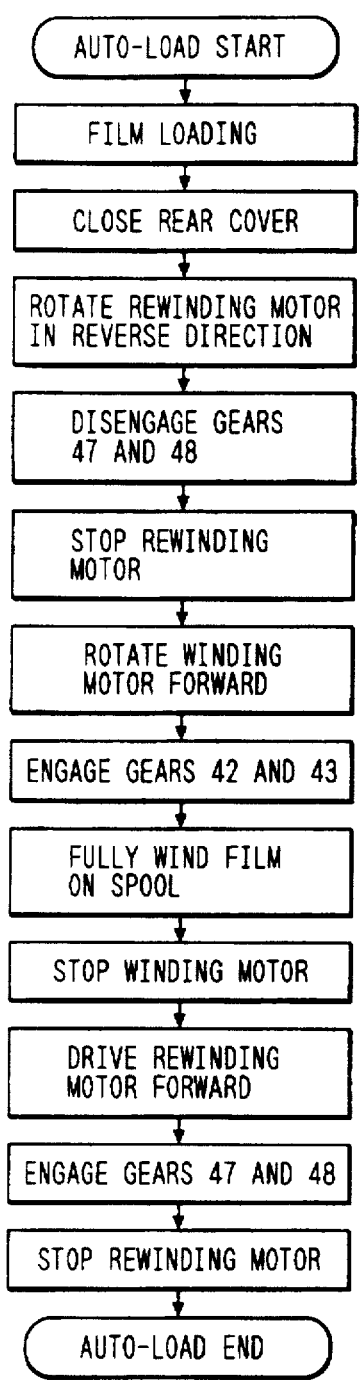
Figure 17:
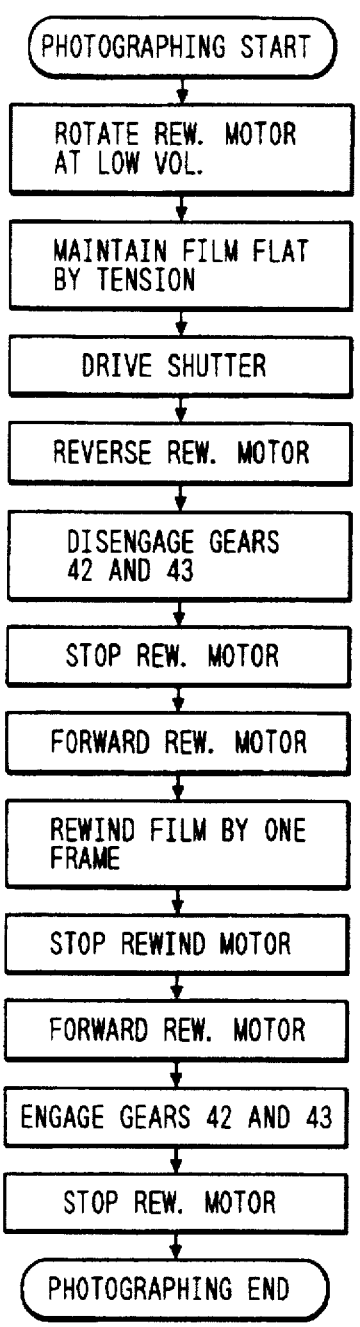
Figure 18:
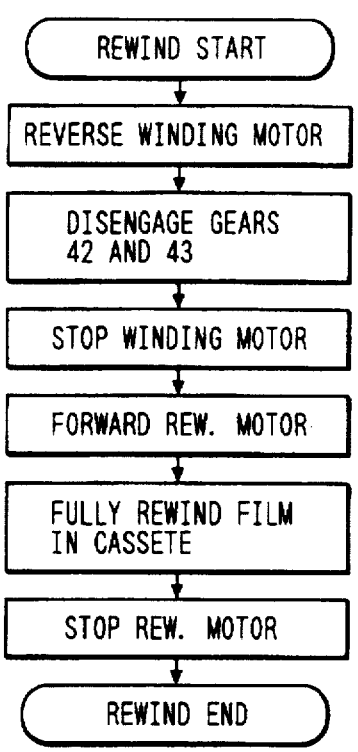

The parts (A) and (B) of FIG. 13 are sectional views for a description of the operations of the spool and its relevant components in the camera of FIG. 12—more specifically, in the part (A) of FIG. 13, the film is being wound, and in the part (B) of FIG. 13, the film has been wound;

FIG. 14 is a diagram showing epicyclic gear trains for driving a film winding mechanism and a film rewinding mechanism in another example of the camera, which constitutes a fifth embodiment of the invention;

FIG. 15 is a sectional view showing a camera body according to another embodiment of the invention; and FIGS. 16 to 18 show a sequential flowchart showing a modification based upon a prewinding system shown in FIG. 15.

DETAILED DESCRIPTION OF THE INVENTION

Preferred embodiments of this invention will be described with reference to the accompanying drawings.

First Embodiment

A camera, which constitutes a first embodiment of the invention, will be described with reference to FIGS. 1 through 8.

Figure 1:
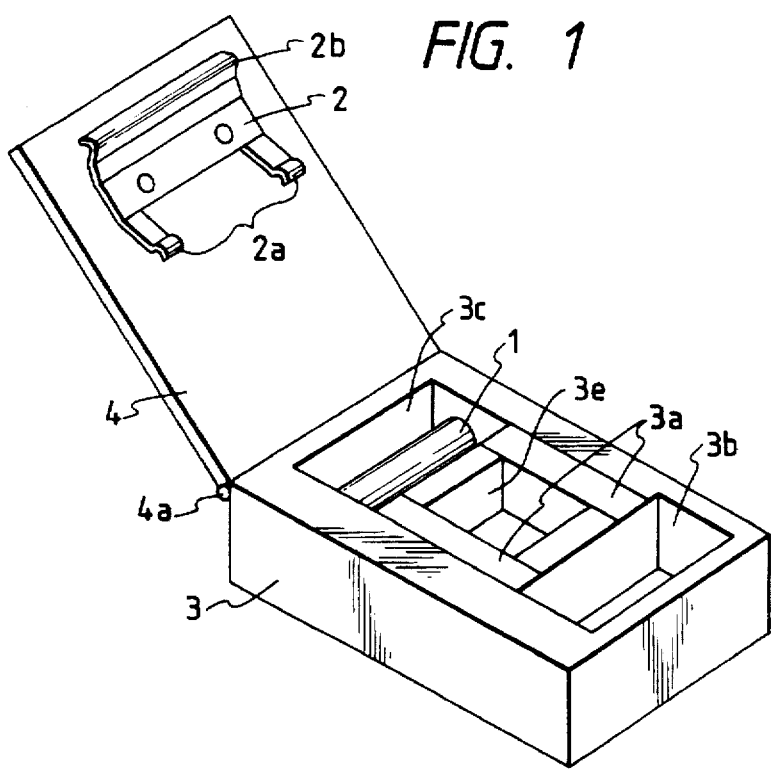
FIG. 1 is a perspective view outlining an example of a camera with the rear cover opened, which constitutes a first embodiment of the invention.
Figure 2:
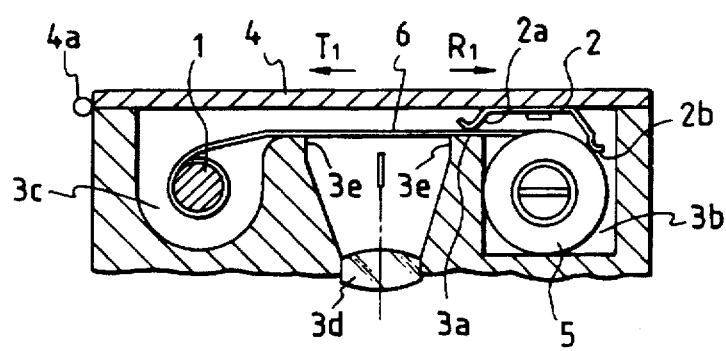
FIG. 2 is a sectional view of the camera with the rear cover closed.

As shown in FIGS. 1 and 2, the camera body 3 of the camera includes: a cassette ("patrone") chamber (or film supplying chamber) 3b in which a cassette 5 is inserted; a spool chamber 3c in which tension applying means, namely, a spool 1 is rotatably provided; and a photographing mask 3e interposed between the cassette chamber 3b and the spool chamber 3c. The photographing mask 3e is located behind a photographing lens 3d. A rear cover 4 is swingably coupled through a hinge 4a to the camera body 3. A leaf spring 2, which is resistance giving means as well as film pushing means, is secured to the rear cover 4 on the side of the cassette chamber 3b. The leaf spring 2 includes a retaining portion 2b which positions the cassette 5 with the rear cover 4 closed, and two pushing portions 2a which hold the film 6 against film supporting surfaces 3a between the photographing mask 3e of the camera body 3 and the cassette chamber 3b. More specifically, the two pushing portions 2a are extended from the upper and lower ends of the body of the leaf spring 2, respectively, so as to push the film against the mask surface at upper and lower points.

FIG. 2 shows the camera in which the cassette 5 is loaded, and the rear cover 4 is closed with a locking mechanism (not shown). The film 6 pulled out of the cassette 5 is retained by the leaf spring 2; that is, a resisting force R1 is applied to it. When the camera is operated; that is, in a photographing operation, a tensile force T1 is applied to the film by the spool 1 to maintain the film flat.

The aforementioned spool 1, and a spool gear 7, to which the spool 1 is coupled, will be described with reference to FIG. 3. The spool 1 and the spool gear 7 are built in the camera body as shown in FIG. 4.

Figure 3:
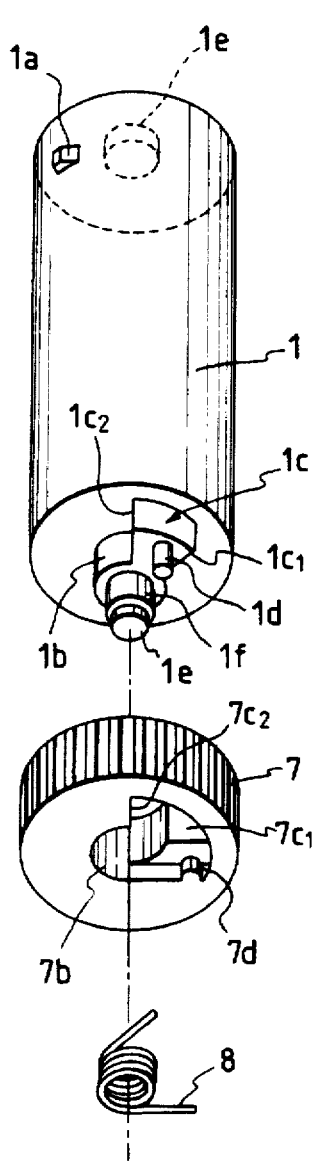
FIG. 3 is an exploded perspective view showing a spool in a winding mechanism in the camera shown in FIG. 1.

The spool 1, as shown in FIG. 3, comprises: a pawl 1a which, in an automatic film loading mode, is engaged with a perforation of the film to wind the latter; a cylindrical portion 1b which is engaged with tension applying means, namely, the spool gear 7; a drive force transmitting portion 1c for transmitting the drive force of the spool gear 7; a shaft if engaged with energizing means, namely, a torsion spring 8; a pin 1d holding the hook of the torsion spring 8; and two bosses 1e on the upper and lower end faces of the spool, the bosses being rotatably engaged with the camera body 3.

The spool gear 7 includes an engaging hole 7b which is engaged with the cylindrical portion 1b of the spool 1; abutting surfaces 7c1 and 7c2 which are abutted against the spool 1 to drive the latter; and a protrusion 7d which is engaged with the hook of the torsion spring 8. With the cylindrical portion 1b of the spool 1 loosely engaged with the engaging hole 7b of the spool gear 7, the latter 7 can be turned in a play mode until the abutting surfaces 1c1 and 1c2 of the drive force transmitting portion 1c abut against the abutting surfaces 7c1 and 7c2 forming the engaging hole 7b, respectively. The torsion spring 8 is adapted to urge the spool 1 in the film winding direction with respect to the spool gear 7.

FIG. 5 shows a change-over epicyclic or planetary gear train for driving a winding mechanism and a rewinding mechanism in the camera. In FIG. 5, the drive force of a drive motor 9 is transmitted through a reduction gear train (not shown) to a sun gear 10 forming a conventional epicycle change-over clutch. The sun gear 10 is engaged through a coupling arm 14 with a planet gear 13. For a change-over operation (described later), the coupling arm 14 is frictionally coupled to the sun gear 10.

When, in the change-over epicyclic gear train, the drive motor 9 is rotated in the forward direction (or in the reverse direction), the planet gear 13 is engaged with the spool gear 7 to drive the spool 1 (or a rewinding gear 11 to drive a rewinding fork gear 12 through a gear train (not shown)), so that the film is wound (or rewound).

That is, when the film is to be wound, the sun gear 10 is turned counterclockwise in FIG. 5, so that the coupling arm 14 is moved to the position 14A, and accordingly the planet gear 13 is moved to the position 13A, thus being engaged with the spool gear 7. Under this condition, the film can be wound. On the other hand, when the film is to be rewound, the sun gear 5 is turned clockwise in FIG. 10, so that the coupling arm 14 is moved to the position 14B, and accordingly the planet gear 13 is moved to the position 13B, thus being engaged with the rewinding gear 11. The latter 11 is engaged through the gear train (not shown) with the rewinding fork gear 12 to rotate the latter 12, so that the shaft in the cassette is turned to rewind the film.

When, with the planet gear 13 engaged with the spool gear 7, a force is applied to the latter 7 in the direction opposite to the winding direction, then the force acts on the planet gear 13 in the direction opposite to the direction in which it is disengaged from the spool gear 7. As a result, the gear train between the spool gear 7 and the drive motor is maintained in coupled state. Because of the cogging torque of the drive motor 9, a stopping torque acts to stop the rotation of the spool gear 7. The torque of the torsion spring 8, which is adapted to turn the spool 1 in the winding direction, is set smaller than the aforementioned stopping torque. Hence, even when the torque of the torsion spring is applied to the spool gear 7, the latter 7 will not be turned.

The film winding operation in the camera will be described with reference to FIGS. 6 through 8, in which reference character W designates the direction in which the spool is turned to wind the film.

In FIG. 6, the film is not wound on the spool 1 yet, and the abutting surface 7c2 of the spool gear 7 and the abutting surface 1c2 of the spool 1 are abutted against each other by the energizing force of the torsion spring 8.

In FIG. 7, the film is being wound. The spool gear 7 is turned in the direction of the arrow W, so that the abutting surface 7c1 of the spool gear 7 pushes the abutting surface 1c1 of the spool 1 to turn the latter 1, thereby to pull the film out of the cassette 5. The torque required for charging the torsion spring 8 as shown in FIG. 7 is set smaller than the spool torque for winding the film 6 on the spool 1.

In FIG. 8, the film has been wound as much as One frame. After the rotation of the spool gear 7 is stopped, the spool 1 is turned in the winding direction W by the energizing force of the torsion spring 8, and a tension T1 is applied to the film 6. The tension T1 is smaller than the resistance force R1 which, in a film winding operation, is given when the film 6 is held between the pushing portions 2a of the leaf spring 2 and the film supporting surfaces 3a of the camera body 3. Therefore, the film 6 is prevented from being further pulled out of the cassette 5.

Now, the operations of the camera thus constructed, from a film loading operation to a photographing operation, will be described.

First, the cassette 5 is loaded in the cassette chamber 3b, and the film 6 is slightly pulled out of it. The end portion of the film 6 thus pulled out is inserted into the spool chamber 3c, and the rear cover 4 is closed. In this operation, the retaining portion 2b of the leaf spring 2 pushes the cassette 5 to stably position the latter 5. At the same time, the pushing portions 2a of the leaf spring 2 press the film 6 except its exposing surface; that is, the upper and lower edges of the film 6 against the abutting surfaces 3a of the camera body 3, thus applying the resistance force R1 to the film.

When the rear cover is closed, the drive motor 9 is turned in the forward direction, so that the planet gear 13 is engaged with the spool gear 7. As a result, the spool 1 is turned, and a perforation of the film 6 is engaged with the pawl 1a of the spool 1 by an automatic loading mechanism (not shown), so that the film 6 is wound on the spool 1. In this operation, a force of pulling out the film due to the film winding torque is much greater than the resistance force R1 produced by the pushing portions 2a of the leaf spring 2, and therefore the film 6 is wound while being pulled out of the cassette. In this film winding operation, the spool 1 and the spool gear cooperate with each other as shown in FIG. 7. In this case, since the torsion spring charging torque is smaller than the film winding torque, the film is wound with the spring 8 charged.

When a film movement detecting section (not shown) detects that the film has been wound as much as one frame, the drive motor 9 stops. The energizing force of the spring 8 thus charged causes the spool gear 7 to be turned in the direction opposite to the winding direction; however, the gear train between the spool gear 7 and the drive motor is maintained connected as was described before, and because of the motor cogging torque, the spool gear 7 is not turned. Hence, the spool 1 is also urged in the winding direction by the energizing force of the torsion spring 8, so that the tensile force T1 is applied to the film 6 which is laid between the spool and the position where the film is pushed against the film supporting surfaces 3a of the camera body by the pushing portions 2a of the leaf spring 2. Thereafter, the film is exposed. In this operation, since the above-described tensile force T1 acts on the film 6 in the above-described manner, the film 6 over the photographing mask 3e is kept flat along the latter 3e as required for the photographing operation.

As was described above, in the first embodiment, when the film winding operation has been accomplished, the tensile force T1 is applied to the film 6 on the camera body 3 to which the film movement resistance force R1 is applied, to the extent that the tensile force T1 does not exceed the resistance force R1. Hence, the camera of the invention dispenses with the pressure plate and the mask frame stop which are essential for the conventional camera. Thus, the camera of the invention can be reduced in thickness as much, and is advantageous in manufacturing cost.

Second Embodiment

Another example of the camera according to the invention, a second embodiment of the invention, will be described.

In the second embodiment, the film winding mechanism and the film rewinding mechanism of the camera are substantially equal to those in the first embodiment. The second embodiment is different from the first embodiment only in the arrangement of film movement resistance force applying means. Its components corresponding functionally to those in the first embodiment are therefore designated by the same reference numerals or characters in FIGS. 3, 4 and 5.

Figure 9:
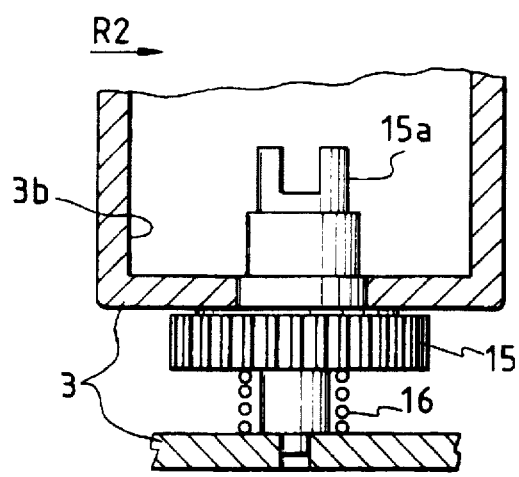
FIG. 9 is a sectional view showing a cassette chamber in another example of the camera, which constitutes a second embodiment of the invention.

FIG. 9 is a sectional view of a cassette chamber 3b in the camera, the second embodiment of the invention. As shown in FIG. 9, at the last stage of the gear train of the rewinding gear 11 (FIG. 5), a rewinding fork gear 15 forming resistance force applying means is arranged instead of the gear 12 (FIG. 5) in the first embodiment. The rewinding fork gear 15 has a fork portion 15a which is protruded in the cassette chamber 3b. One surface of the fork gear 15, which is on the side of the cassette chamber 3, may be pushed against the outer surface of the cassette chamber 3. First energizing means forming the resistance force applying means, namely, a coil spring 16 is held charged between the other (opposite) surface of the fork gear 15 and the supporting portion of the camera body 3. The elastic force of the coil spring thus charged frictionally holds the rewinding force gear 15, thus producing a resistance force R2 against the feeding of the film 6.

In the second embodiment, the spool and the spool gear are equal in construction to those in the first embodiment which are shown in FIG. 3, thus serving as tensile force applying means in the film winding operation. The torsion spring 8 for urging the spool 1 in the winding direction with respect to the spool gear 7 is second energizing means in the second embodiment. The tensile force T1 applied to the film 6 by the torsion spring 8 is smaller than the film movement resistance force R2 provided by the coil spring 16.

The operations of the camera thus constructed, from a film loading operation up to a photographing operation, will be described.

First, a cassette 5 is loaded in the camera, and the rear cover 4 is closed. Thereupon, the automatic loading mechanism starts the film winding operation. At the same time, a reflex type photo interrupter (not shown) for counting perforations of the film 6 is turned on and off, to detect an amount of movement (feed) of the film. Normally, the film is wound as much as four frames; i.e., 32 (=4×8) perforations (each frame having eight (8) perforations); that is, a blind film-feeding operation is carried out. When the thirty-two (32) perforations have been counted, the drive motor 9 stops. Thereafter, the drive motor 9 is rotated in the opposite direction, so that the planet gear 13 is engaged with the rewinding gear 11; that is, the above-described rewinding fork gear 15 is turned in the rewinding direction. As a result, the film wound loosely in the cassette begins to tighten, and finally it is wound on the spool tight in the cassette, thus being pulled in the cassette.

When, under this condition, one (1) perforation is counted with the aid of the reflex type photo interrupter, the direction of rotation of the drive motor 9 is changed; that is, it is rotated in the forward direction. As a result, the planet gear 13 is engaged with the spool gear 7, so that the spool 1 is turned in the winding direction. In this operation, since the film winding torque is much greater than the friction provided by the coil spring 6, the rewinding fork gear 15 is turned with the film 6 being pulled out of the cassette. Thus, the film 6 is wound on. When, under this condition, the photo interrupter detects that the film has been wound as much as one (1) perforation, the drive motor 9 stops. Now, the film can be subjected to exposure. In this state, the film is maintained flat. That is, similarly as in the above-described first embodiment the torsion spring 8 built in the spool 1 applies a tensile force T1, which is smaller than a film movement resistance force R2 which is given to the film 6 by the friction of the coil spring 16, to the film 6, so that the latter 6 is maintained flat on the photographing mask 3e. During exposure of the film, the resistance force R2 and the tensile force T1 act on the film similarly as in the above-described case, thus keeping the latter flat.

As was described above, in the first embodiment, the leaf spring 2 is employed as the resistance applying means. On the other hand, in the second embodiment, the coil spring 16 adapted to energize the rewinding fork gear 15 is employed as the resistance force applying means. Therefore, in the second embodiment, the rear cover 4 can be simple in structure, and the camera can be decreased in thickness, being advantageous in manufacturing cost.

Third Embodiment

Another example of the camera, which constitutes a third embodiment of the invention, will be described.

In the third embodiment, its film movement resistance force applying means employs the film pushing leaf spring 2 used in the first embodiment, or the coil spring 16 adapted to urge the fork gear 15 in the second embodiment. Further in the third embodiment, its film winding mechanism employs a spool integral with a spool gear, and a winding motor is operated to directly drive the spool of the winding mechanism. In the film winding operation the drive voltage of the winding motor is set high, and in the film exposing operation the winding motor is driven at a low voltage controlled by film tension applying means (described later) to apply a tensile force T3 to the film to thereby maintain the latter flat. The film movement resistance force R1 or R2 provided by the film movement resistance force applying means is set greater than the tensile force T3. Hence, even when the winding motor is driven at the low voltage, the film is not wound, and it is therefore maintained flat.

The third embodiment includes a control circuit for a winding drive section and a shutter drive section in the camera. The control circuit, as shown in FIG. 10, comprises: a CPU 21 (central processing unit) for controlling various control elements; a film movement detecting photo reflector 23; a waveform shaping circuit 22 for shaping the output signal of the photo reflector 23; a shutter drive circuit 24; a shutter unit 25 driven by the shutter drive circuit 24; a winding motor 28 for winding a film; a winding motor voltage setting circuit 27 for setting a drive voltage for the winding motor 28; a winding motor drive circuit 26 for driving the winding motor with the drive voltage set by the voltage setting circuit 27; and a release switch 29.

Figure 10:
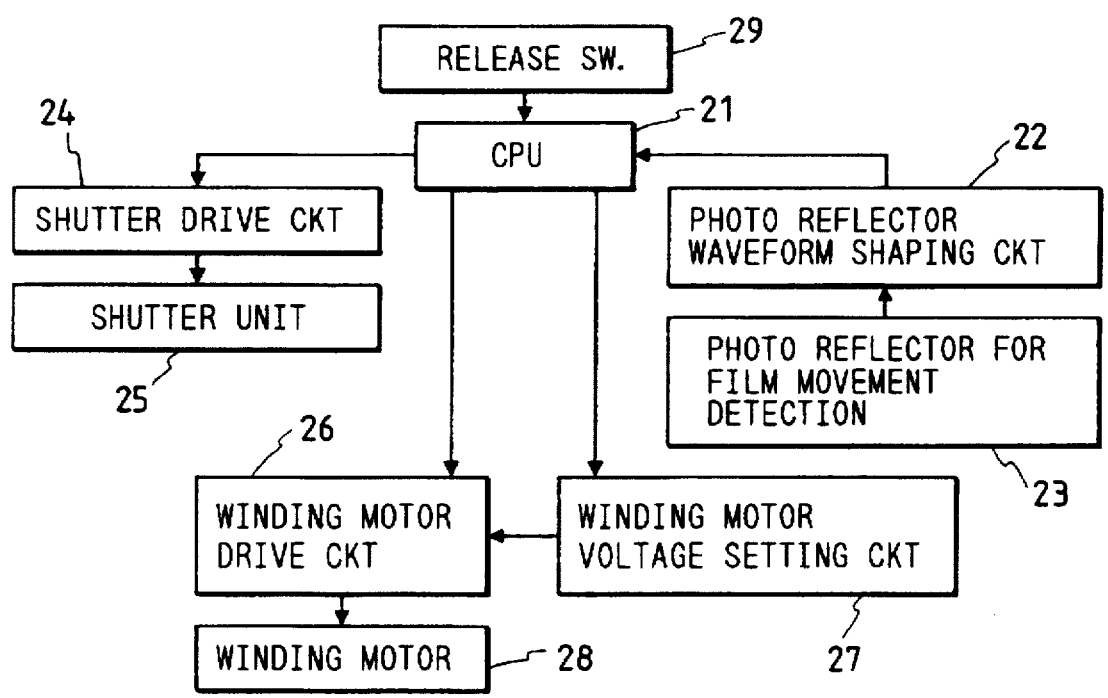
FIG. 10 is a block diagram showing the arrangement of a control circuit for a film winding drive section and a shutter drive section in another example of the camera, which constitutes a third embodiment of the invention.

In the control circuit shown in FIG. 10, the CPU 21, the winding motor 28, the winding motor voltage setting circuit 27, and the winding motor drive circuit 26 form the aforementioned film tension applying means. In order that, before the film is exposed with the shutter unit 25 operated, the aforementioned tensile force T3 is applied to the film, the CPU 21 causes the voltage setting circuit 27 to set a low voltage, as a drive voltage, for the winding motor driving circuit 26. The low voltage thus set is applied to the winding motor 28, so that the latter 28 produces torque large enough to apply the tensile force T3 to the film on the photographing mask.

Figure 11:
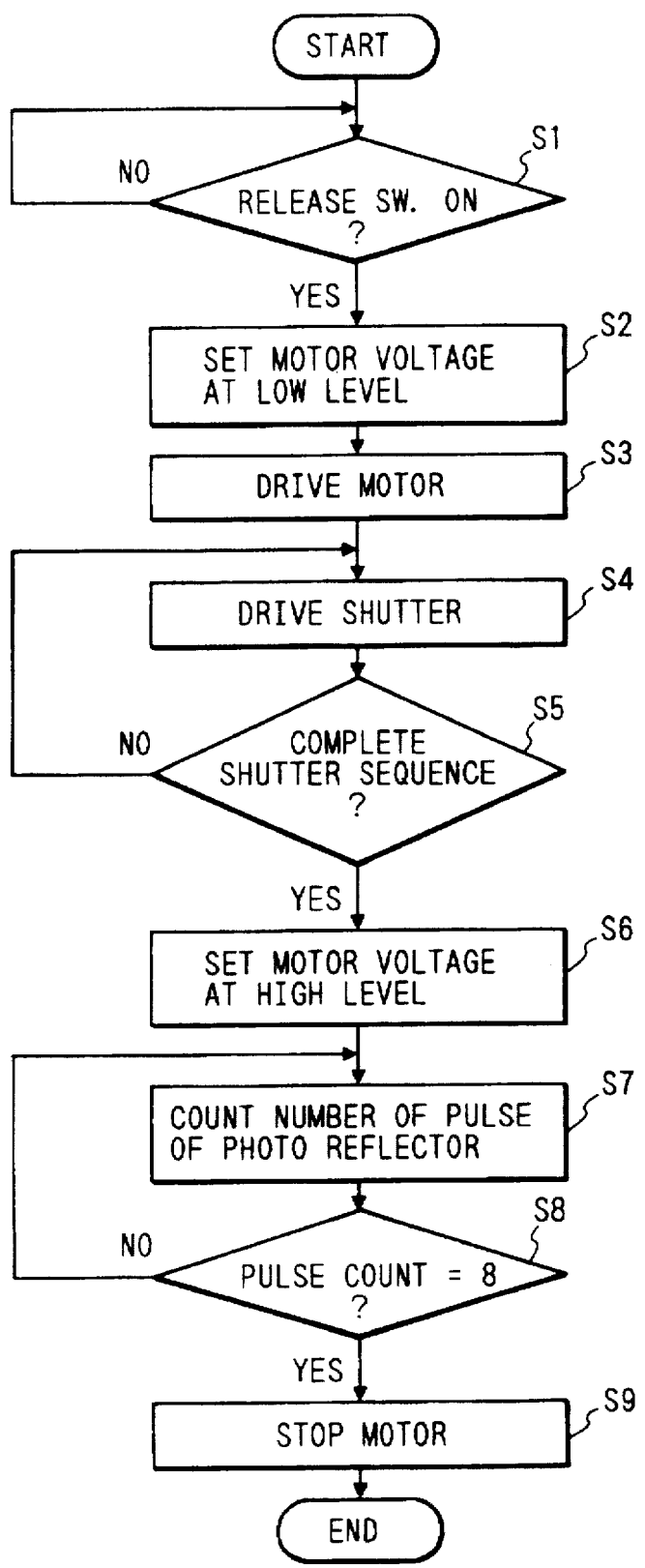
FIG. 11 is a flow chart for a description of a photographing operation of the camera of FIG. 10.

A photographing operation of the camera thus constructed will be described with reference to FIG. 11, a flow chart.

It is assumed that the film winding operation has been accomplished, and the film movement resistance force R1 is applied to the film on the side of the film supplying chamber. In Step S1, it is detected whether or not the release switch 29 is turned on. When it is determined that the release switch 29 has been turned on, Step S2 is effected. In Step S2, the drive voltage of the drive circuit 26 is set low with the aid of the voltage setting circuit 27, and then Step S3 is effected. The low voltage thus set is applied to the winding motor 28, so that the latter 28 produces the aforementioned predetermined torque. The torque thus produced is applied through the gear train (not shown) to the spool, to apply the tensile force T3 to the film on the photographing mask. The tensile force T3 is smaller than the above-described film movement resistance force R1, and therefore the film will not be pulled out. Thus, the film on the photographing mask is maintained flat.

Next, in Steps S4 and S5, the shutter unit 25 is operated, so that the film is exposed. Thereafter, in Step S6, the drive voltage of the drive circuit 26 is set high with the aid of the winding motor 28 voltage setting circuit 27, and the winding motor is driven. Thereafter, in Step S7, the output pulses of the photo reflector 23 are counted. In Step S8, it is determined whether or not the photo reflector 23 has outputted eight (8) pulses corresponding to the fact that the film is wound as much as one frame. When it is determined that eight (8) pulses have been outputted, Step S9 is effected, to stop the winding motor 28. Thus, the routine is ended.

As is apparent from the above description, in the third embodiment, unlike the first embodiment, it is unnecessary to provide a mechanism forming the tension applying means in the spool mechanism. That is, in the third embodiment, the tensile force is applied to the film merely by controlling the voltage which is applied to the winding motor. Thus, the third embodiment, when compared with the first embodiment, is advantageous in the effective use of the space in the camera, and in the reduction of the manufacturing cost.

Fourth Embodiment

Another example of the camera, a fourth embodiment of the invention, will be described.

In the fourth embodiment, similarly as in the above-described third embodiment, its film movement resistance force applying means employs the film pushing leaf spring 2 of the first embodiment, or the coil spring 16 adapted to urge the fork gear 15 in the second embodiment. Furthermore, in the winding mechanism, a spool integral with a spool gear is employed, and a winding motor is operated to drive the spool of the winding mechanism. The fourth embodiment is advantageous in the effective use of the space in the camera, and in the reduction of the manufacturing cost.

Furthermore, in the fourth embodiment, its film tension applying means employs conventional automatic loading rollers 31 and 32, as shown in FIG. 12. In addition, a tension applying member, namely, a roller 33 is employed. The roller 31 is rotatably mounted on a shaft 31c which is supported by a guide board 31a. The guide board 31a is supported on the camera body; more specifically, it is rotatably mounted on a shaft 31b supported by the camera body in such a manner that the roller 31 is urged towards against the spool 35 by a spring (not shown). Similarly as in the case of the roller 31, the roller 32 is rotatably mounted on a shaft 32c which is supported by a guide board 32a. The guide board 32a is supported on the camera body; more specifically, it is rotatably mounted on a shaft 32b supported by the camera body in such a manner that the roller 32 is pushed towards the spool 35 by a spring (not shown).

The roller 33c is also rotatably mounted on a shaft 33 supported by a guide board 33a. The guide board 33a is supported on the camera body; more specifically, it is rotatably mounted on a shaft 33b supported by the camera body in such a manner that the roller 33 is pushed towards the spool 35 by a torsion spring 34. When a film 6 is loaded in the camera, the roller 33 is positioned between the photographing mask (not shown) and the spool 35 while pushing the rear surface 6a of the film 6 which is on the film path between the photographing mask and the spool 35 as shown in FIG. 13.

A film winding operation in the camera thus constructed, and states of the film during the photographing operation will be described.

Figure 13A:
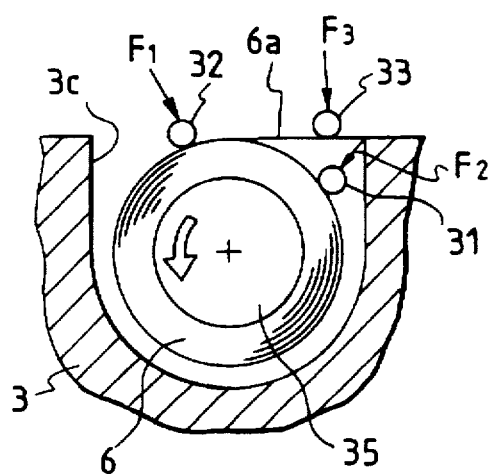

FIG. 13A shows a state where a cassette (not shown) is loaded in the camera, and the film 6 is being wound on the spool 35. In this state, the rollers 31 and 32 apply forces of depression F1 and F2 to the outer cylindrical surface of the film wound on the spool 35, so that the film is held wound on it. The roller 33 applies a force of depression F3 to the rear surface 6a of the film 6; however, during the film winding operation, it is at a retracted position being pushed by the film 6 as shown in FIG. 13A.

Figure 13B:
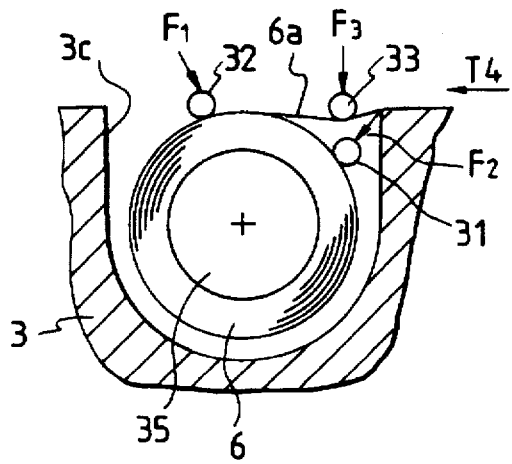

When the film winding operation is accomplished with the spool 35 stopped, the tensile force applied to the film 6 by the spool 35 is eliminated. However, as shown in FIG. 13B, the spring force of the torsion spring 34 causes the roller 33 to push the rear surface 6a of the film 6, so that the latter 6 is held depressed, with a predetermined tensile force T4 being applied to the film 6. The tensile force T4 is smaller than the resistance force R1 applied by the film movement resistance force applying means, and therefore the film 6 will not be further fed. The tensile force T4 maintains the film 6 flat on the photographing mask.

As is apparent from the above description, in the camera the tension applying means, namely, the roller 33 is located near the photographing mask, and therefore the tensile force T4 is effectively applied to the film; that is, the film is held flat more positively.

Fifth Embodiment

Another example of the camera, a fifth embodiment of the invention, will be described.

A specific feature of the fifth embodiment resides in that the film movement resistance force and the tensile force are provided by drive motors, namely, a winding motor and a rewinding motor through the gear train of a winding mechanism and the gear train of a rewinding mechanism. Hence, the fifth embodiment dispenses with special means such as the film movement resistance force applying means and the tension applying means which have been described above.

In the fifth embodiments the arrangement of first gear means, namely, an epicyclic gear train between a winding motor 40 and a winding spool 52 in the camera, and the arrangement of second gear means, namely, an epicyclic gear train between a rewinding motor 45 and a rewinding fork gear 53 are as shown in FIG. 14.

A drive force is applied from the winding motor 40 through a reduction gear train (not shown) to a sun gear 41. The sun gear 41 is engaged with a planet gear 42 forming a conventional epicycle change-over clutch. A gear arm 44 is frictionally coupled to the sun gear 41. Therefore, when the motor 40 is rotated in the forward direction, the planet gear 42 is engaged with the winding gear 43, so that the winding spool gear 52 can be driven; that is, the film can be wound. When the motor 40 is rotated in the opposite direction; i.e., in the reverse direction, the planet gear 42 is disengaged from the winding gear 43, so that the winding spool gear cannot be driven. The planet gear 42 idles with the gear arm 44 abutted against a first stop 50. First detecting means, namely, a position detecting switch 54 is provided to determine whether or not the winding spool gear can be driven; that is, whether or not the planet gear 42 is engaged with the winding gear 43.

A drive force is applied from the winding motor 45 through a reduction gear train (not shown) to a sun gear 46. The sun gear 46 is engaged with a planet gear 47 forming a conventional epicycle change-over clutch. A gear arm 49 is frictionally coupled to the sun gear 46. Therefore, when the motor 45 is rotated in the forward direction, the planet gear 47 is engaged with the rewinding gear 48, so that the rewinding fork gear 53 can be driven; that is, the film can be rewound. When the motor 45 is rotated in the opposite direction; i.e., in the reverse direction, the planet gear 47 is disengaged from the rewinding gear 48, so that the rewinding spool gear cannot be driven. The planet gear 47 idles with the gear arm 49 abutted against a second stop 51. Second detecting means, namely, a position detecting switch 55 is provided to determine whether or not the rewinding fork gear can be driven; that is, whether or not the planet gear 47 is engaged with the rewinding gear 48.

Let us consider the case where a cassette has been loaded in the camera, and the planet gear 47 is engaged with the rewinding gear 48, and the film is wound tight in the cassette. When, in this case, a force is applied to pull the film out of the cassette, then the force acts on the planet gear 47 to cause the latter to bite the rewinding gear 48 thereby to turn the rewinding motor 45. However, the rewinding motor 45 has a cogging torque, which is relatively small, and the gears between the rewinding fork gear 53 and the rewinding motor 45 form a speed increasing gear train, and therefore, even if it is tried to turn the rewinding fork gear 53 in the reverse direction, it is considerably difficult to do so.

When, in the case where the film is wound on the winding spool and the planet gear 42 is engaged with the winding gear 43, the film is pulled in the film rewinding direction, then the planet gear 42 bites the winding gear 43 thereby to turn the winding motor 40. However, the motor 40 has a cogging torque, and the gears between the winding spool gear 52 and the winding motor 40 form a speed increasing gear train, and therefore the film cannot be rewound from the spool without a considerably great force.

The film winding operation, photographing operation, and film rewinding operation of the camera thus constructed will be described.

After the film has been rewound, the rewinding motor 45 is rotated in the reverse direction. When the position detecting switch 55 detects that the planet gear 47 is disengaged from the rewinding gear 48, the motor 45 stops. Under this condition, the planet gear 47 has been disengaged from the rewinding gear 48, and therefore the rewinding fork gear 53 can turn freely. Therefore, when, with the cassette loaded, the automatic loading mechanism starts, the winding motor 40 is rotated in the forward direction, so that the planet gear 42 is engaged with the winding gear 43, and the winding spool gear 52 is rotated to wind the film on the spool. Thus, the film winding operation has been accomplished.

Before a photographing operation, the rewinding motor 45 is rotated in the forward direction, so that the planet gear 47 is engaged with the rewinding gear 48, and the rewinding fork gear 53 is turned in the rewinding direction. On the other hand, in this case, the planet gear 42 is maintained engaged with the winding gear 43, and therefore even if it is tried to run the film in the film rewinding direction, the winding spool gear 52 cannot be turned in that direction. Therefore, a tensile force is applied to the film to maintain the latter flat. In the above-described operation, the drive voltage of the rewinding motor 45 is set low to the extent that the film is not fed. Thereafter, the shutter of the camera is operated.

After the shutter is operated, the film winding operation is carried out. That is, the rewinding motor 45 is turned in the reverse direction, so that the planet gear 47 is disengaged from the rewinding gear 48. Therefore, the position detecting switch 55 provided for the planet gear 47 is operated, and the rewinding motor 45 stops. Now, the rewinding fork gear is free. Therefore, the winding motor 40 is rotated in the forward direction, so that the planet gear 42 is engaged with the winding gear 43, and the winding spool gear 52 is turned to wind the film.

In rewinding the film, the winding motor 40 is turned in the reverse direction, so that the planet gear 42 is disengaged from the winding gear 43. Therefore, the position detecting switch 54 is operated, and the winding motor 40 stops. Now, the winding spool gear is free. Therefore, the rewinding motor 45 is rotated in the forward direction, so that the planet gear 47 is engaged with the rewinding gear 48, and the rewinding fork gear 53 is turned to rewind the film.

As was described above, in order to maintain the film flat during exposure, the film movement resistance force and the tensile force are provided by controlling the engagement and disengagement of the gear trains of the film winding mechanism and the film rewinding mechanism, and by controlling the drive voltage of the winding motor. Hence, the fifth embodiment dispenses with special means such as the film movement resistance force applying means and the tension applying means which have been described before. In addition, the fifth embodiment is advantageous in the effective use of the space in the camera; that is, the camera can be miniaturized as much, and furthermore it is advantageous in the reduction of the manufacturing cost.

In the fifth embodiment, the source for applying the tensile force to the film during exposure is the winding motor 40. However, the fifth embodiment may be modified as follows: That is, the drive voltage of the rewinding motor 45 is set low to apply the tensile force to the film. In this case, the planet gear 42 on the side of the winding gear train should be held engaged with the winding gear 43.

Sixth Embodiment

FIG. 15 shows still another embodiment of the invention. In this embodiment, the invention is applied to a so-called prewinding type camera. The "prewinding" type camera itself is well known in the art, in which during the loading of the film cassette, the film contained in the cassette is once fully wound onto the winding spool, and thereafter, the film is rewound into the cassette to an extent as much as one frame of the film for every shot.

In FIG. 15, the film is returned into the film cassette by rotating a rewinding shaft (not shown) clockwise. A low level voltage is applied to a drive means for driving the rewinding fork gear during the photographing state to such an extent that the film is moved. Then, the same specific drive mechanism as shown in FIG. 14 may be used. The same flowchart as shown in FIG. 11 may be used in the sixth embodiment. In this case, the "winding motor" should be replaced by a "rewinding motor".

FIGS. 16, 17 and 18 show a further embodiment in which the invention is applied to the prewinding type camera. The difference between the sixth embodiment and the further embodiment is that, in FIG. 15, a leaf spring 100 is provided as a load applying means on the side of the spool 1, whereas in FIGS. 16 to 18, the tension is obtained by driving the winding motor at a low voltage for driving the winding spool. The same mechanism as shown in FIG. 14 may be used in these embodiments.

As is apparent from the above description, in the camera of the invention, at least during exposure the film movement resistance force is applied to the film and the tensile force is applied to the film on the photographing mask, whereby the film is maintained flat when exposed. Hence, the camera of the invention dispenses with the pressure plate which is essential for the conventional camera to maintain the film flat, which makes it possible to reduce the thickness of the camera, and to decrease the number of components as much.

What is claimed is:

1. A camera having a camera body including a photographing mask, a film supply portion on one side of the photographing mask and a film winding portion on the other side of the photographing mask, the camera comprising:

a non-sprocket film winding spool positioned in the film winding portion;

means for driving the film winding spool;

means for applying to the film a predetermined film movement resistance on a side of the film supply portion; and an arm having one end pivotally attached to the camera body and an opposite and supporting a roller, the arm selectively moveable to bring the roller into engagement with the film to apply to the film a tension smaller than the film movement resistance to maintain the flatness of the film at the photographing mask.

2. A camera having a camera body including a photographing mask, a film supply portion on one side of the photographing mask and a film winding portion on the other side of the photographing mask, the camera comprising:

a non-sprocket film winding spool positioned in the film winding portion;

means for driving the film winding spool;

means for applying to the film a predetermined film movement resistance on a side of the film supply portion; and means for applying to the film a tension smaller than the film movement resistance on a side of the film winding portion, the tension applying means including a roller biased to push the film toward the film winding portion between said film winding spool and the photographing mask, the roller rotatably attached to a guide board that is pivotally disposed on the camera body and biased toward the film winding particularly a torsion spring.

3. The camera of claim 2, wherein the guide board includes a pair of arms and a base plate mounted on a shaft that is mounted on the camera body.

* * * * *

UNITED STATES PATENT AND TRADEMARK OFFICE
CERTIFICATE OF CORRECTION

PATENT NO. : 5,682,568
DATED : October 28, 1997
INVENTOR(S) : Tatsuya SUZUKI et al.

It is certified that error appears in the above-indentified patent and that said Letters Patent is hereby corrected as shown below:

In claim 1, column 15, line 28, "opposite and" should read --opposite end--.

Signed and Sealed this

Fifth Day of May, 1998

*Attest:*

BRUCE LEHMAN

*Attesting Officer*    *Commissioner of Patents and Trademarks*